(12) United States Patent
Cho et al.

(10) Patent No.: US 6,971,748 B2
(45) Date of Patent: Dec. 6, 2005

(54) HIGH-RESOLUTION DISPLAY INCLUDING PIXEL MOVING OPTICAL SYSTEM

(75) Inventors: Kun-ho Cho, Gyeonggi-do (KR); Dae-sik Kim, Gyeonggi-do (KR); Sung-ha Kim, Gyeonggi-do (KR); Hee-joong Lee, Gyeonggi-do (KR); Tae hee Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 3 days.

(21) Appl. No.: 10/629,721

(22) Filed: Jul. 30, 2003

(65) Prior Publication Data

US 2004/0041784 A1    Mar. 4, 2004

(30) Foreign Application Priority Data

Jul. 30, 2002    (KR) .................... 10-2002-0044866

(51) Int. Cl.[7] .............................................. G03B 21/14
(52) U.S. Cl. ....................... 353/46; 353/81; 359/211
(58) Field of Search ........................ 353/30, 31, 34, 353/37, 38, 46, 48, 81; 359/209, 210, 211; 348/742, 743; 349/5, 7, 8, 9

(56) References Cited

U.S. PATENT DOCUMENTS

| | | | | |
|---|---|---|---|---|
| 5,005,968 A | * | 4/1991 | Tejima et al. ............. | 353/122 |
| 5,250,967 A | * | 10/1993 | Miyashita ................ | 353/38 |
| 5,420,718 A | * | 5/1995 | Davies et al. ............. | 359/448 |
| 5,719,706 A | | 2/1998 | Masumoto et al. | |
| 5,751,383 A | * | 5/1998 | Yamanaka ................ | 349/13 |
| 5,872,654 A | * | 2/1999 | Shirochi ................. | 359/566 |
| 5,971,546 A | * | 10/1999 | Park ...................... | 353/38 |
| 6,078,441 A | | 6/2000 | Lahood | |
| 6,243,055 B1 | | 6/2001 | Fergason | |

FOREIGN PATENT DOCUMENTS

| | | |
|---|---|---|
| EP | 0 802 685 | 10/1997 |
| WO | WO 02/13541 | 2/2000 |

* cited by examiner

*Primary Examiner*—William C. Dowling

(74) *Attorney, Agent, or Firm*—Staas & Halsey LLP

(57) ABSTRACT

A high-resolution display displaying an image on a screen includes an illumination optical system, an image optical system, a pixel moving optical system, and a projection optical system. The illumination optical system includes a light source emitting a light. The image optical system includes an image forming device modulating an incident light to form the image. The pixel moving optical system includes a prism array deflecting the light from the image optical system to move pixels of the image to increase a number of pixels. The projection optical system includes a projection lens projecting the deflected light by the pixel moving optical system onto the screen.

21 Claims, 13 Drawing Sheets

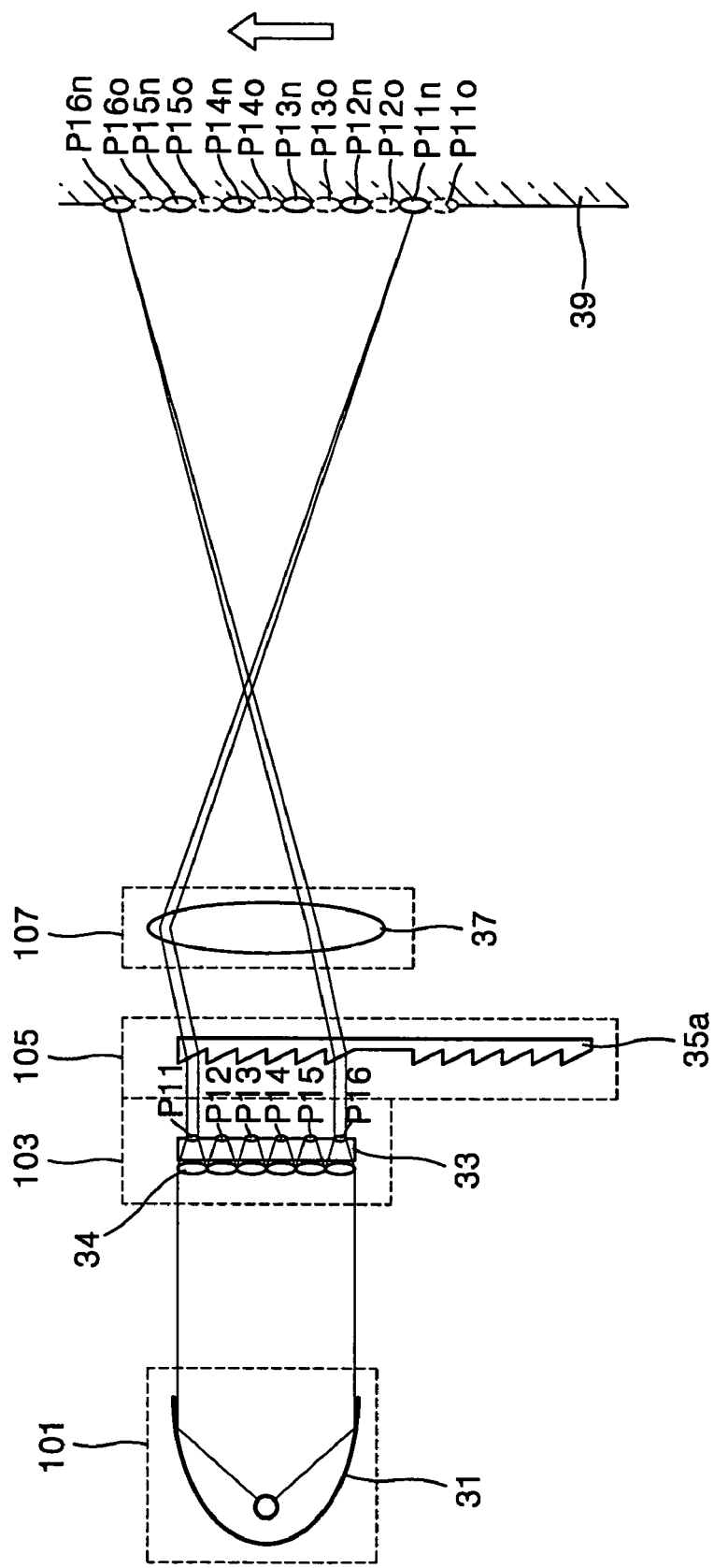

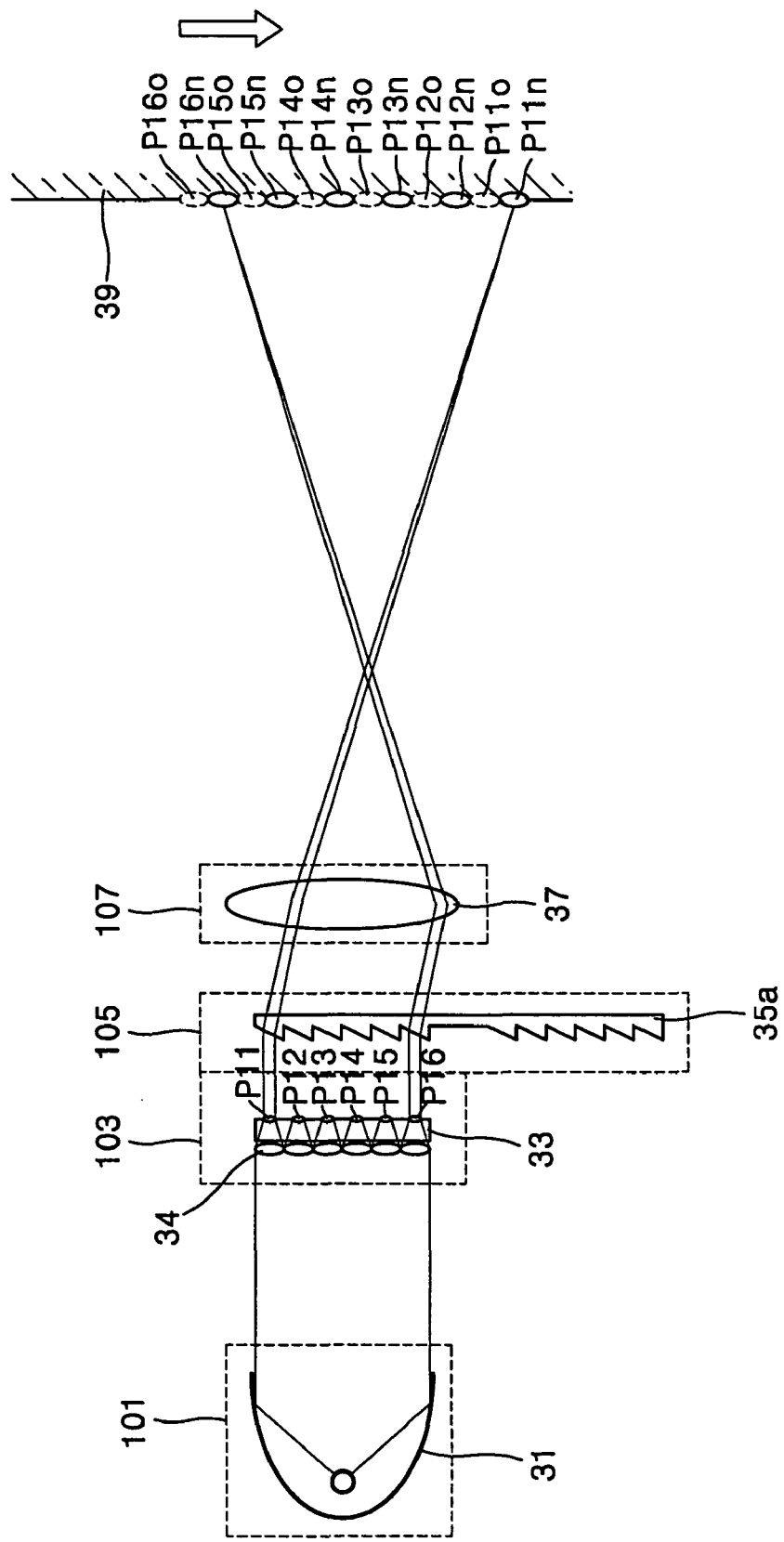

HIGH-RESOLUTION DISPLAY INCLUDING PIXEL MOVING OPTICAL SYSTEM

CROSS-REFERENCE TO RELATED APPLICATIONS

This application claims the priority of Korean Patent Application No. 2002-44866, filed on Jul. 30, 2002, which is incorporated herein in its entirety by reference.

BACKGROUND OF THE INVENTION

1. Field of the Invention

The present invention relates to a high-resolution display, and more particularly, to a high-resolution display where a resolution is increased by moving pixels fast.

2. Description of the Related Art

Generally, a resolution of an image indicates a number of pixels used to display the image. More pixels lead to a more accurate image display and an increase in a volume of the image. The resolution of the image indicates an amount of information contained in a single image, i.e., the number of pixels constituting the single image, and is used as a unit to measure a size of an image. For example, a 1×1 inch image having a resolution of 72 dots per inch (dpi) is composed of a total of 5184 (=72×72) pixels, and a 1×1 inch image having a resolution of 300 dpi is composed of a total of 90,000 (=300×300) pixels.

FIG. 1 is a diagram showing a structure of a conventional display. The conventional display includes a light source 11, a light valve 13, which modulates light emitted from the light source 11 so as to form the image, an image transformation device 15, which performs interpolation on an image signal received from the light valve 13 to increase the number of pixels and outputs the image signal resulting from the interpolation, and a projection lens 17, which projects the modulated light received from the light valve 13 onto a screen 19. Pixels A formed by the light output from the light valve 13 are enlarged by the projection lens 17, thereby forming the image composed of pixels B on the screen 19. The conventional display increases the number of pixels using a circuit structure, i.e., the image transformation device 15 connected to the light valve 13.

As for matrix-type display, such as liquid crystal displays and plasma displays, the resolution or aspect ratio of the display image is physically fixed depending on the displays. For example, a signal supported by a video graphic array (VGA) has a resolution of 640×480 dots. In the field of television broadcasting, resolution is not specifically defined in a horizontal direction but is generally defined in a vertical direction, as a number of scan lines that can be displayed on the screen, for example, 480 scan lines for an NTSC TV.

In order to display the image signal on, for example, a liquid crystal panel having a resolution of 1024×768 dots supported by an extended graphics array (XGA), the display needs the image transformation device 15, which performs the interpolation so as to convert the resolution of the input image signal into the resolution corresponding to the display.

Conventional displays perform an operation of increasing the number of pixels using the image transformation device 15 in order to convert the image from a low resolution of, for example, 70 dpi, into a high resolution of, for example, 300 dpi. However, in actuality, the image is displayed on the screen at the low resolution of 70 dpi, so the high resolution is not realized. Moreover, the conventional displays cannot provide a satisfactory image quality when displaying the image on a large screen.

SUMMARY OF THE INVENTION

Additional aspects and/or advantages of the invention will be set forth in part in the description which follows and, in part, will be obvious from the description, or may be learned by practice of the invention.

The present invention provides a high-resolution display that can display a high-quality image having high resolution even on a large screen by using a pixel moving optical system that moves each pixel fast in horizontal and vertical directions.

According to an aspect of the present invention, there is provided a high-resolution display displaying an image on a screen, including a light source emitting a light; an image optical system including an image forming device modulating the light incident to form the image; a pixel moving optical system including a prism array deflecting the light from the image optical system to move pixels of the image to increase a number of pixels; and a projection optical system including a projection lens projecting the deflected light by the pixel moving optical system onto the screen.

According to an aspect of the present invention, the image forming device is a light valve including a liquid crystal display (LCD).

According to an aspect of the present invention, the image optical system further includes a micro lens array reducing the pixels of the image formed by the image forming device.

In one aspect of the present invention, the ring-shaped prism array may include a plurality of ring-shaped prisms concentrically arranged and having slants inclined in one direction so that the modulated light is deflected in a first direction and, after the ring-shaped prism array rotates by 180 degrees, the modulated light is deflected in a second direction opposite to the first direction.

In another aspect of the present invention, the ring-shaped prism array may include a plurality of ring-shaped prisms concentrically arranged and having slants inclined in one direction so that the modulated light is deflected in a first direction and, after the ring-shaped prism array rotates by 180 degrees, the modulated light is deflected in a second direction opposite to the first direction.

In still another aspect of the present invention, the ring-shaped prism array may include a plurality of fan-shaped prisms arranged around a center thereof to form a ring shape and having slants of symmetrical patterns with respect to a predetermined axis so that the modulated light is deflected in a first direction and, after the ring-shaped prism array rotates by 180 degrees, the modulated light is deflected in a second direction opposite to the first direction.

In still another aspect of the present invention, the ring-shaped prism array may be comprises a plurality of fan-shaped prisms arranged around a center thereof to form a ring shape and having slants of symmetrical patterns with respect to a predetermined axis so that the modulated light is deflected in a first direction and, after the ring-shaped prism array rotates by 180 degrees, the modulated light is deflected in a second direction opposite to the first direction.

In still another aspect of the present invention, the ring-shaped prism array may include a plane lens having a fan shape in at least ⅓ of an entire area thereof to transmit the modulated light, and in a remaining area thereof a plurality of prisms are concentrically arranged, which comprise slants inclining in one direction so that the modulated light is deflected in a first direction and, after the ring-shaped prism array rotates by 120 degrees, the modulated light is deflected in a second direction opposite to the first direction.

According to an aspect of the present invention, there is provided a ring-shaped prism array or a mirror array, which deflects light, in a pixel moving optical system disposed between an image optical system and a projection optical system in order to fast move each pixel of the image generated by the image optical system in horizontal and vertical directions so that the number of pixels can be increased. Consequently, the present invention provides an image of high resolution.

BRIEF DESCRIPTION OF THE DRAWINGS

These and other aspects and/or advantages of the invention will become apparent and more readily appreciated from the following description of the aspects, taken in conjunction with the accompanying drawings of which:

FIGS. 6A and 6B are plane views of the high-resolution display including the first ring-shaped prism array shown in FIG. 5, according to a second aspect of the present invention;

DETAILED DESCRIPTION OF THE INVENTION

Figure 1:
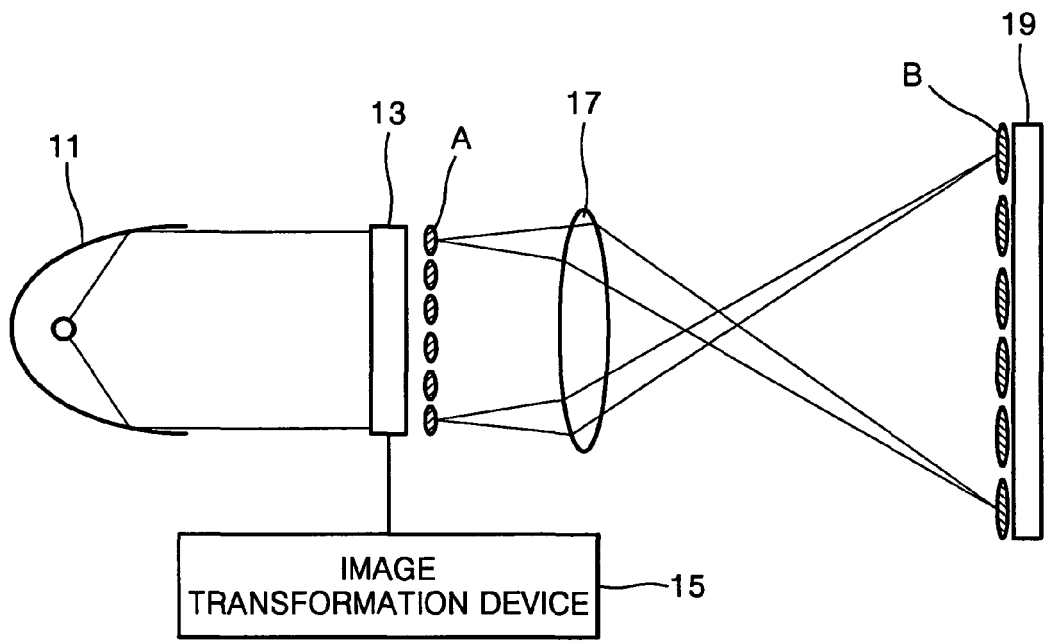
FIG. 1 is a schematic diagram of a conventional display.

Reference will now be made in detail to the aspects of the present invention, examples of which are illustrated in the accompanying drawings, wherein like reference numerals refer to like elements throughout. The aspects are described below in order to explain the present invention by referring to the figures.

Figure 2:
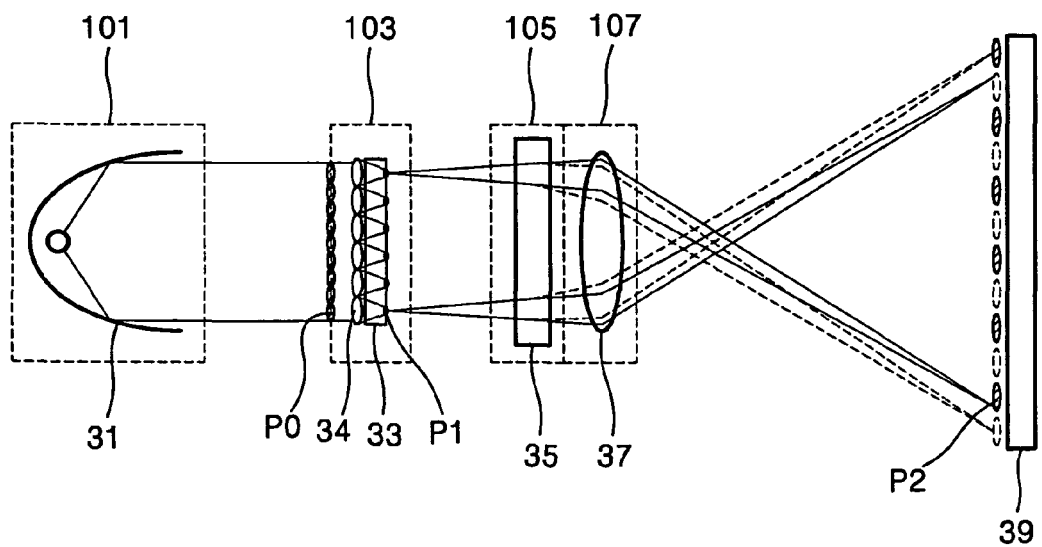
FIG. 2 is a schematic diagram of a high-resolution display, according to an aspect of the present invention.

FIG. 2 is a schematic diagram of a high-resolution display including a pixel moving optical system, according to an aspect of the present invention. Referring to FIG. 2, the high-resolution display includes an illumination optical system 101 emitting light, an image optical system 103 modulating incident light according to an input image signal to form an image, a pixel moving optical system 105 deflecting the modulated light in horizontal and vertical directions to move pixels, and a projection optical system 107 including a projection lens 37 projecting the light onto a screen 39 to display an image.

The illumination optical system 101 includes a light source 31 emitting the light including a plurality of red, green, and blue light beams. The illumination optical system 101 can also include a collimating lens, which collimates the light, or a relay lens, which shapes the light, in front of the light source 31 to uniformly emit the light toward the image optical system 103. In addition, the illumination optical system 101 can also include a color separation optical device, such as a color filter, a dichroic mirror, or a dichroic prism to separate the red, green, and blue light beams from a white light emitted from the light source 31, so that the different color light beams can travel through different optical paths. A high-luminance white light source, such as a metal halide lamp, a xenon lamp, or a halogen lamp, can be used as the light source 31.

The image optical system 103 includes a light valve 33 modulating the incident light according to the input image signal to form the image and a micro lens array 34 converting pixels P0 into pixels P1 having a reduced size on a back of the light valve 33. Here, any type of widely spread electronic light valve, such as a projection or reflection liquid crystal display (LCD), a ferroelectric device, or a deformable mirror, can be used as the light valve 33. In the LCD, when a voltage is applied to each pixel, an array of liquid crystal molecules is changed, so the optical characteristics of the LCD is changed. The LCD modulates light by changing a polarization of the incident light so as to form the image.

As shown in FIG. 2, the micro lens array 34 reduces the pixels P0 generated in the light valve 33 into the pixels P1 so that spacing is formed among the pixels P1. As the spacing among the pixels P0 increases, optical efficiency decreases. Accordingly, while the pixels P0 are maintained, the micro lens array 34 is provided on an optical path of the light output from the light valve 33 so that the optical efficiency can be maintained and spacing among the pixels P1 can be widened.

Figure 3A:
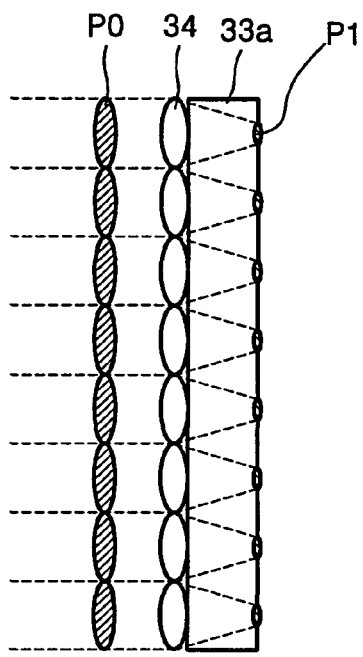
FIG. 3A is a diagram showing a principle of reducing pixels in a projection light valve used in the high-resolution display, according to an aspect of the present invention.
Figure 3B:
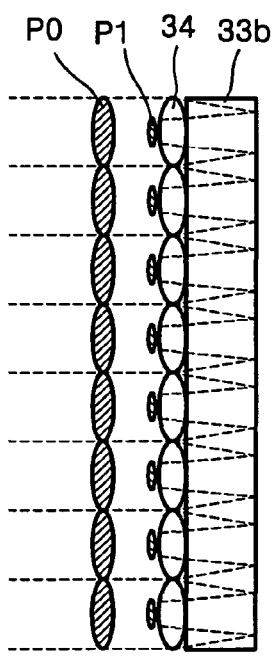
FIG. 3B is a diagram showing the principle of reducing the pixels in a reflection light valve of the high-resolution display, according to an aspect of the present invention.

FIGS. 3A and 3B are schematic diagrams showing principles of restructuring the pixels P0 into the pixels P1 using the micro lens array 34 in a projection light valve 33a and a reflection light valve 33b, respectively.

Referring to FIG. 3A, the micro lens array 34 focuses the light through the projection light valve 33a, thereby forming the pixels P1 smaller than the pixels P0 on the back of the projection light valve 33a. Referring to FIG. 3B, the incident light is reflected from the back of the reflection light valve 33b and then passed through the micro lens array 34, so the size of the pixels P0 is reduced, forming the pixels P1.

Referring to FIG. 2, the pixel moving optical system 105 includes a beam steering device 35 to quickly move the modulated light from the image optical system 103 in the horizontal and vertical directions so as to display the pixels P1 in the spacing among the pixels P1 on the screen 39 with a slight time delay, thereby increasing the number of pixels. With the increase in the number of pixels, the image is displayed at a resolution four times higher than the original resolution, so a high resolution can be achieved. The beam steering device 35 moves a pixel at a time by changing the traveling direction of the incident light. By rotating the beam steering device 35 during the image display, high resolution can be achieved.

Figure 4:
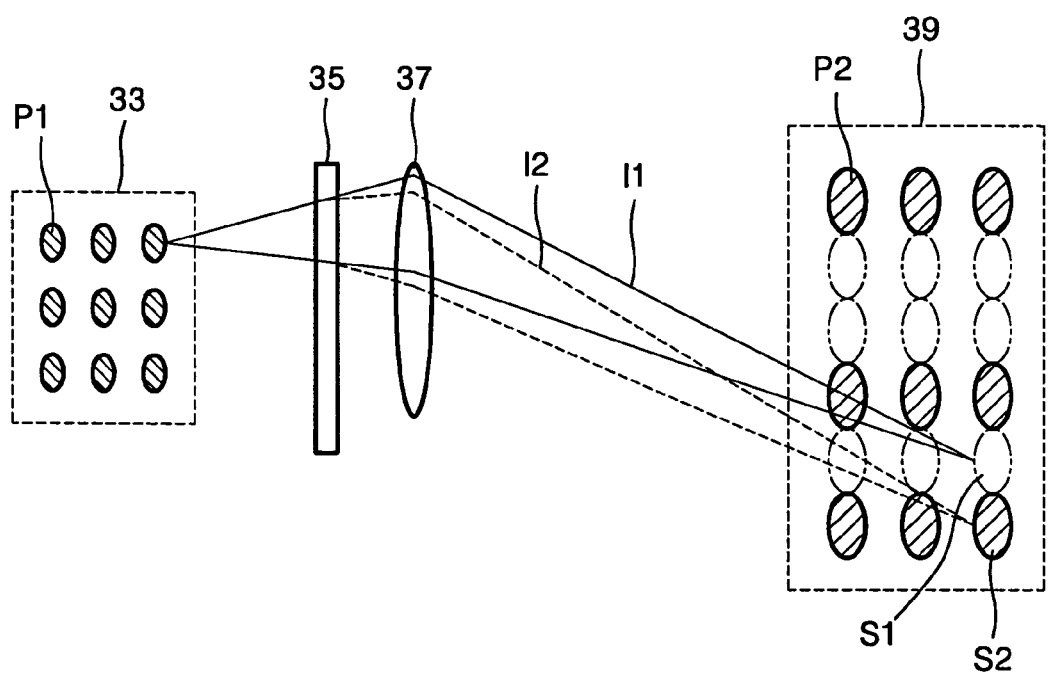
FIG. 4 is a schematic diagram showing a principle of pixel movement performed by a steering device of the high-resolution display, according to an aspect of the present invention.

FIG. 4 is a diagram showing a principle of pixel movement performed by the beam steering device 35 of the pixel moving optical system 105 in order to restructure the pixels P1 into pixels P2 on the screen 39. The pixels P1 are reduced by an image optical system including the micro lens array 34 and the light valve 33, forming an inter-pixel spacing. If the beam steering device 35 is not used in the pixel moving optical system 105, the light forming the pixel P1 travels along an optical path 11 and forms a pixel Si on the screen 39. The beam steering device 35 changes the optical path of the light forming the pixel P0 into an optical path 12 so that a pixel S2 is displayed in an inter-pixel spacing on the screen 39. With such a manner of displaying the pixel S2 in the inter-pixel spacing by deflecting the light forming the pixel S1 in the horizontal and vertical directions, the number of pixels displayed on the screen 39 is increased, thereby increasing resolution. For example, when the pixels of a 2×2 image are moved in the horizontal and vertical directions, a four times higher resolution of 4×4 can be achieved.

Referring back to FIG. 2, the projection optical system, including the projection lens 37, projects the light whose optical path is changed by the beam steering device 35 on the screen 38, thereby displaying the high-resolution image having an increased number of pixels.

Figure 5:
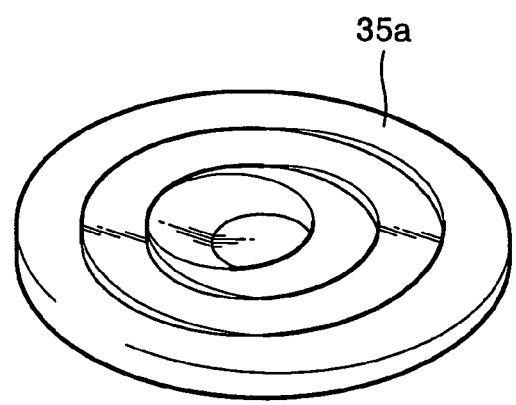
FIG. 5 is a perspective view of a first ring-shaped prism array, according to a first aspect of the present invention.

FIG. 5 is a perspective view of a first ring-shaped prism array 35a having slants in one direction, according to a first aspect of the present invention. The first ring-shaped prism array 35a is used as the beam steering device 35 of a high-resolution display, according a first aspect of the present invention.

In the first ring-shaped prism array 35a, a plane lens is disposed at a center and a plurality of ring-shaped prisms are concentrically disposed around the center. The plurality of ring-shaped prisms have a slant tilting to one side so that the ring-shaped prisms deflect the light in a first direction at an initial stage and in a second direction, opposite to the first direction, after the ring-shaped prisms rotate by 180 degrees. The first and second directions may be up and down directions or left and right directions.

FIGS. 6A and 6B are plane views of the high-resolution display including the first ring-shaped prism array 35a and show the movement of the pixels when the first ring-shaped prism array 35a rotates, according to a second aspect of the present invention.

Referring to FIGS. 5 and 6A, the light forming the pixel on the light valve 33 on the back left side of the first ring-shaped prism array 35a is deflected to the left by the first ring-shaped prism array 35a due to the slants declining in one direction. Accordingly, pixels P11, P12, P13, P14, P15, and P16 output from the light valve 33 appear on the screen 39 as pixels P11n, P12n, P13n, P14n, P15n, and P16n displaced from original pixel positions P11o, P12o, P13o, P14o, P15o, and P16o to the left.

As shown in FIG. 6B, when the first ring-shaped prism array 35a is rotated by 180 degrees, right and left portions of the first ring-shaped prism array 35a are switched, so the slants of the first ring-shaped prism array 35a decline in an opposite direction. Accordingly, the light forming the pixels P11, P12, P13, P14, P15, and P16 is deflected to the right and, thus, forms new pixels P11n, P12n, P13n, P14n, P15n, and P16n on the screen 39 displaced from the positions of the original pixels P11o, P12o, P13o, P14o, P15o, and P16o to the right. Consequently, the number of pixels displayed on the entire screen 39 increases.

In other words, in a case where the light passing through a first half portion of the first ring-shaped prism array 35a is deflected to a right of an optical axis, and when the first ring-shaped prism array 35a rotates by 180 degrees and, thus, a second half portion of the first ring-shaped prism array 35a is moved to a previous position of the first half portion, the direction of the slants on which the light is incident becomes opposite, so the light is deflected to the left of the optical axis. With such deflection, the pixels P11n, P12n, P13n, P14n, P15n, and P16n are displayed on the screen 39 on the right and left sides of the original pixels P11o, P12o, P13o, P14o, P15o, and P16o.

However, in a case where the light passing through the first half portion of the first ring-shaped prism array 35a is deflected down from the optical axis, and when the first ring-shaped prism array 35a rotates by 180 degrees and, thus, the second half portion of the first ring-shaped prism array 35a is moved to the previous position of the first half portion, the light is deflected up from the optical axis. With such deflection, the pixels P11n, P12n, P13n, P14n, P15n, and P16n are displayed on the screen 39 on up and down sides of the original pixels P11o, P12o, P13o, P14o, P15o, and P16o.

Figure 7:
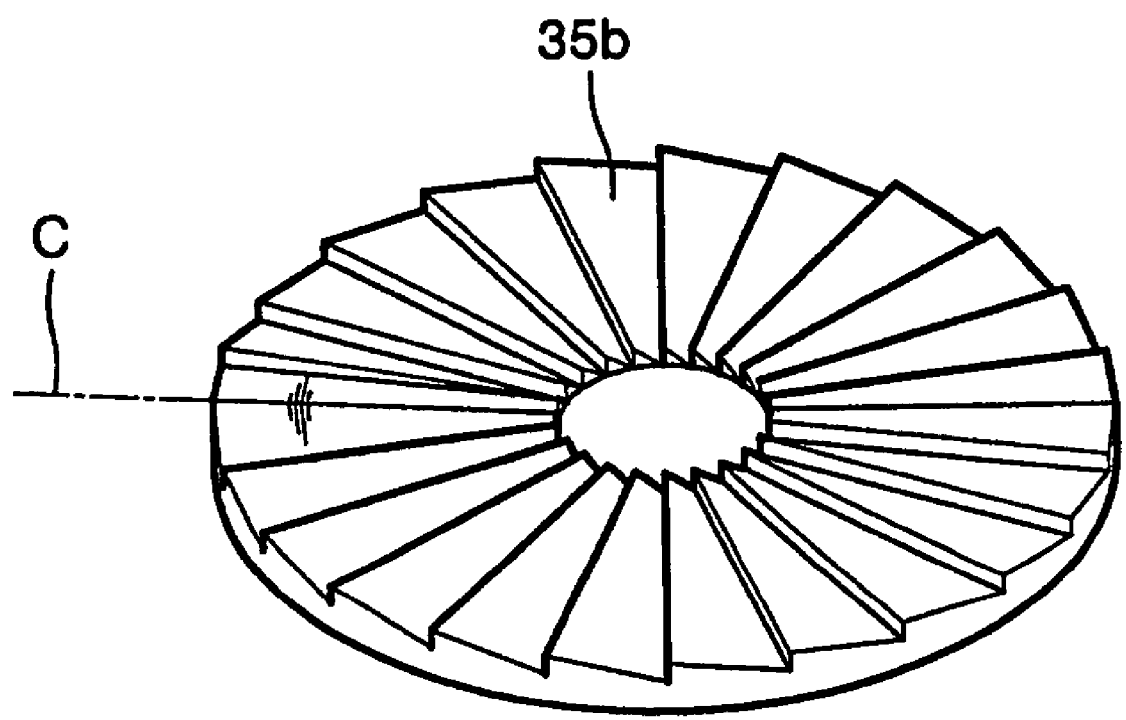
FIG. 7 is a perspective view of a second ring-shaped prism array, according to a first aspect of the present invention.

FIG. 7 is a perspective view of a second ring-shaped prism array 35b used as the beam steering device 35 of a high-resolution display, according to a first aspect of the present invention. The second ring-shaped prism array 35b has slants in a symmetrical pattern about an axis C.

In the second ring-shaped prism array 35b, the pattern of the slants of prisms arranged in a first half portion is symmetrical with the pattern of the slants of prisms arranged in a second half portion with respect to the axis C, and each prism has a shape of a fan. Each prism in the second ring-shaped prism array 35b initially deflects the light in a first direction, and after the second ring-shaped prism array 35b rotates by 180 degrees, the second ring-shaped prism array deflects the light in a second direction opposite to the first direction. The first and second directions may be up and down directions or left and right directions, respectively.

Figure 8A:
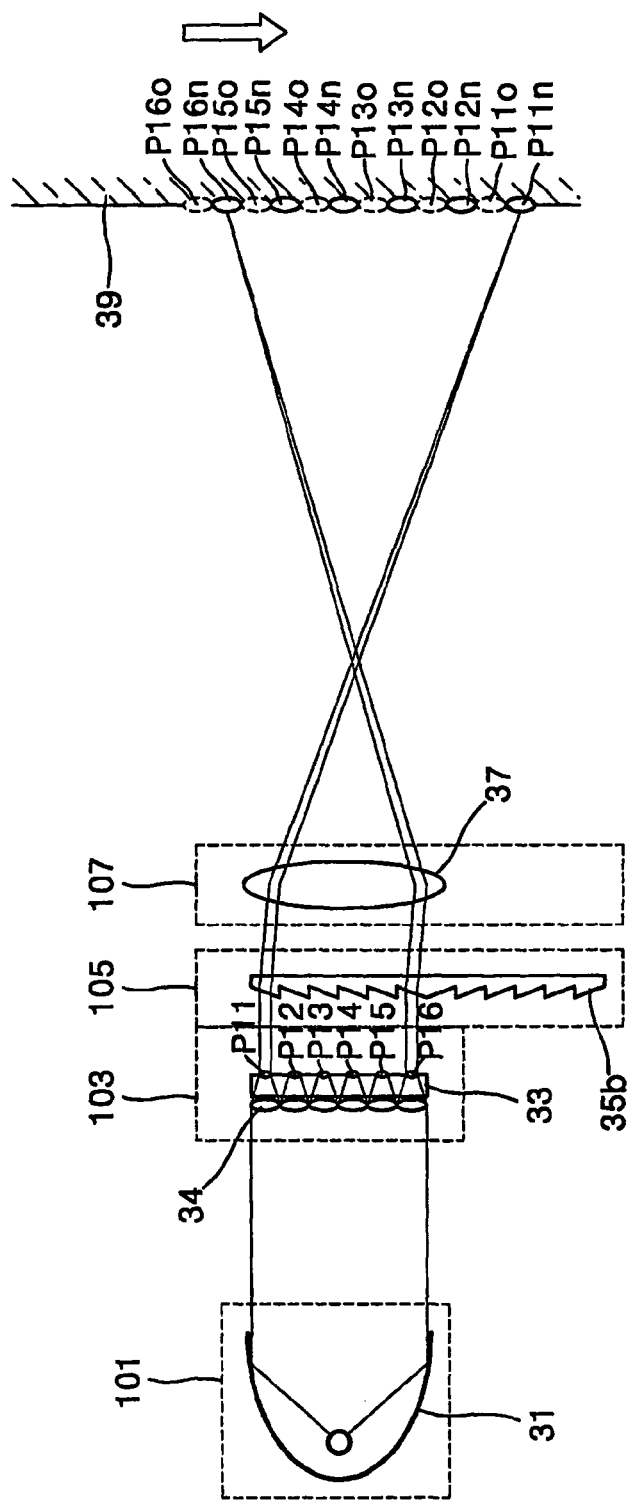
FIGS. 8A and 8B are elevation views of the high-resolution display including the second ring-shaped prism array shown in FIG. 7, according to a second aspect of the present invention.
Figure 8B:
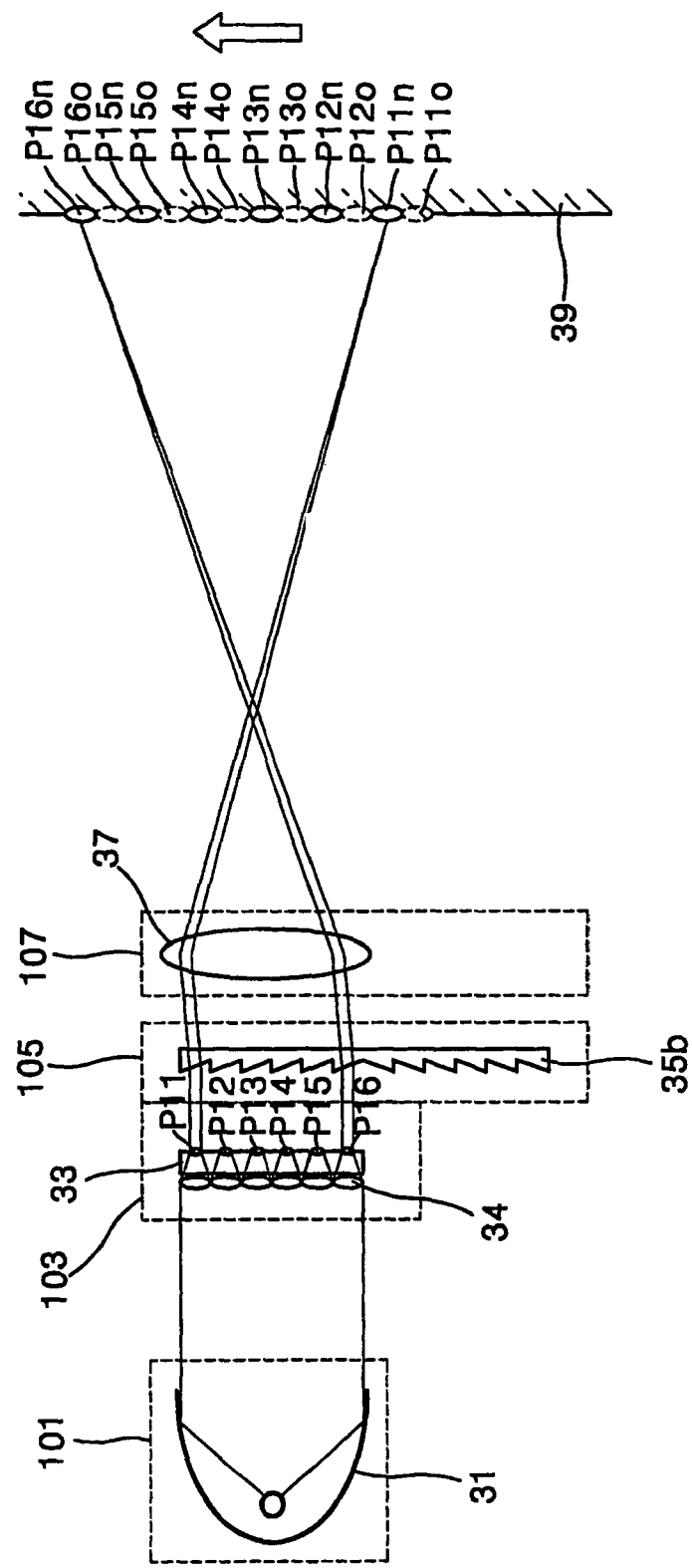

FIGS. 8A and 8B are elevation views of the high-resolution display including the second ring-shaped prism array 35b, according to a second aspect of the present invention.

Referring to FIG. 8A, in the high-resolution display according to the second aspect of the present invention, the light emitted from the light source 31 is reflected by the micro lens array 34 and then passes through the light valve 33 to form pixels P11, P12, P13, P14, P15, and P16. Thereafter, the light is deflected downward by the second ring-shaped prism array 35b and, thus, forms pixels P11n, P12n, P13n, P14n, P15n, and P16n on the screen 39 displaced downward from the positions of the original pixels P11o, P12o, P13o, P14o, P15o, and P16o.

Referring to FIG. 8B, when the prism positioned at the lower right portion of the second ring-shaped prism array 35b shown in FIG. 8A is moved to the upper left portion after the rotation of the second ring-shaped prism array 35b, the direction of the slants becomes opposite to that shown in FIG. 8A, and, thus, the light is deflected up. Accordingly, the pixels P11, P12, P13, P14, P15, and P16 appear as new pixels P11n, P12n, P13n, P14n, P15n, and P16n on the screen 39 displaced upward from the positions of the original pixels P11o, P12o, P13o, P14o, P15o, and P16o. Consequently, the number of pixels displayed on the screen 39 increases to twice as many as the number of original pixels P11o, P12o, P13o, P14o, P15o, and P16o, thereby increasing the resolution, so that a user can view the image of high quality. The speed of the moving pixels depends on the speed of rotation of the beam steering device 35. Accordingly, the speed of moving pixels is increased by increasing the speed of rotation so that a person can view a seamless image due to an optical illusion.

When the first and second ring-shaped prism arrays 35*a* and 35*b* are sequentially disposed in front of the light valve 33, the pixels P11, P12, P13, P14, P15, and P16 move up, down, to the left, and to the right. Consequently, the original resolution of the image can be increased four times.

Figure 9:
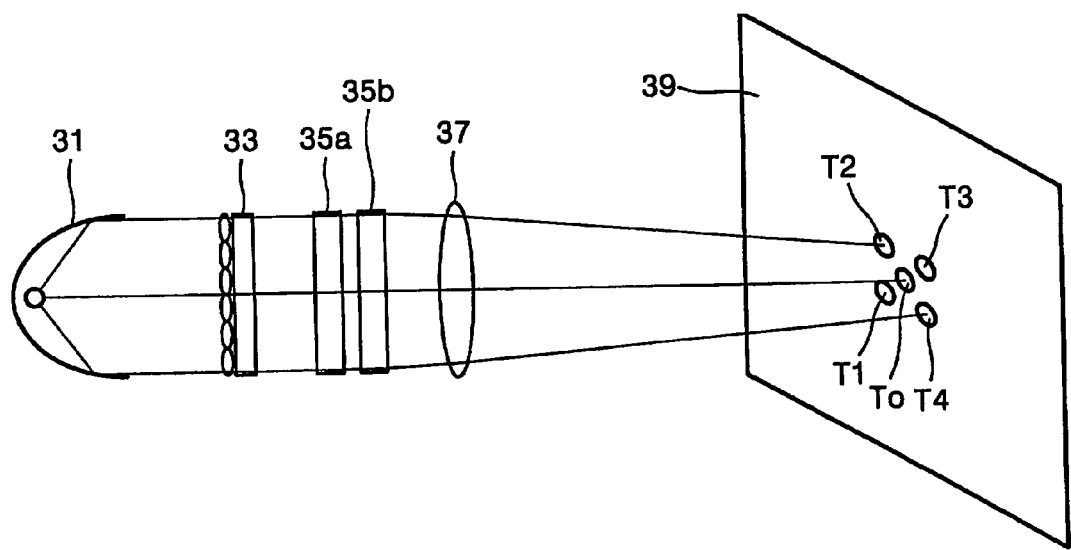
FIG. 9 is a schematic diagram of the high-resolution display including the first and second ring-shaped prism arrays shown in FIGS. 5 and 7, according to a third aspect of the present invention.

FIG. 9 is a schematic diagram of the high-resolution display according to a third aspect of the present invention. Referring to FIG. 9, the light emitted from the light source 31 is deflected to the left or to the right by the first ring-shaped prism array 35*a*, and is then deflected up or down by the second ring-shaped prism array 35*b*.

For example, when the light is deflected to the left by the first ring-shaped prism array 35*a* and is then deflected down by the second ring-shaped prism array 35*b*, an original pixel To that is expected to be displayed on the screen 39, when the first and second ring-shaped prism arrays 35*a* and 35*b* do not exist, is moved to the lower left, appearing as a pixel T1. Next, when the second ring-shaped prism array 35*b* rotates by 180 degrees while the first ring-shaped prism array 35*a* keeps still, the original pixel To is moved to the upper left, appearing as a pixel T2. Next, when the first ring-shaped prism array 35*a* rotates by 180 degrees while the second ring-shaped prism array 35*b* keeps still, the original pixel To is moved to the upper right, appearing as a pixel T3. Next, when the second ring-shaped prism array 35*b* rotates by 180 degrees while the first ring-shaped prism array 35*a* keeps still, the original pixel To is moved to the lower right, appearing as a pixel T4. Here, spacing exists among the pixels T1, T2, T3, and T4 so that the picture quality is uniform so as to make the image soft as a whole, in addition to having an increase in the resolution.

Figure 10:
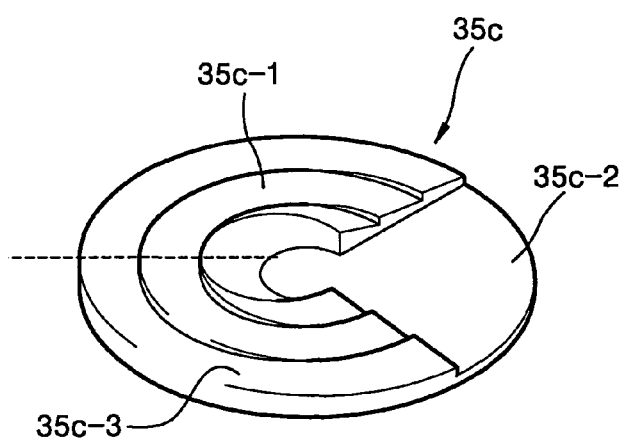
FIG. 10 is a perspective view of a third ring-shaped prism array.

A third ring-shaped prism array 35*c* shown in FIG. 10 can be used for light valve 33 in which the pixel is divided into the plurality of color light beams, i.e., red (R), green (G), and blue (B) light beams. Referring to FIG. 10, the third ring-shaped prism array 35*c* included in the high-resolution display, according to an aspect of the present invention, includes first through third regions 35*c*-1, 35*c*-2, and 35*c*-3. In the first and third regions 35*c*-1 and 35*c*-3, the plurality of ring-shaped prisms having the slants inclining in one direction are concentrically arranged around the center in a similar manner to the first ring-shaped prism array 35*a* shown in FIG. 5. The second region 35*c*-2 occupies ⅓ of the entire area of the third ring-shaped prism array 35*c*, forming a fan shape, and is realized as a plane lens.

The light incident on the second region 35*c*-2, i.e., the plane lens, passes through without being deflected and, thus, forms the original pixel at an original position on the screen 39. The light incident on the first region 35*c*-1 is deflected in the first direction, and light incident on the third region 35*c*-3 is deflected in the second direction opposite to the first direction. Here, the first and second directions may be up and down directions or left and right directions.

Figure 11A:
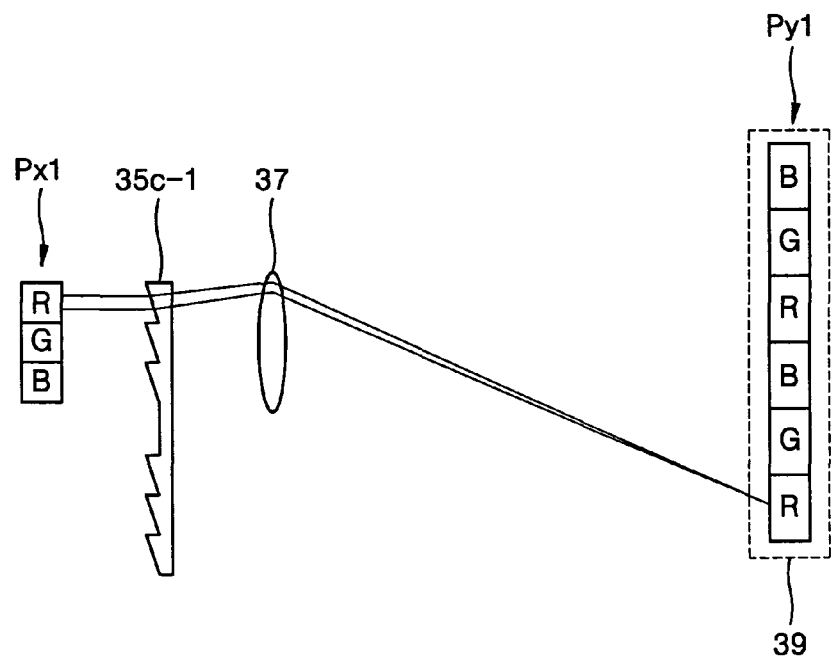
FIGS. 11A through 11C are schematic diagrams of the high-resolution display including the third ring-shaped prism array shown in FIG. 10, according to an aspect of the present invention.
Figure 11B:
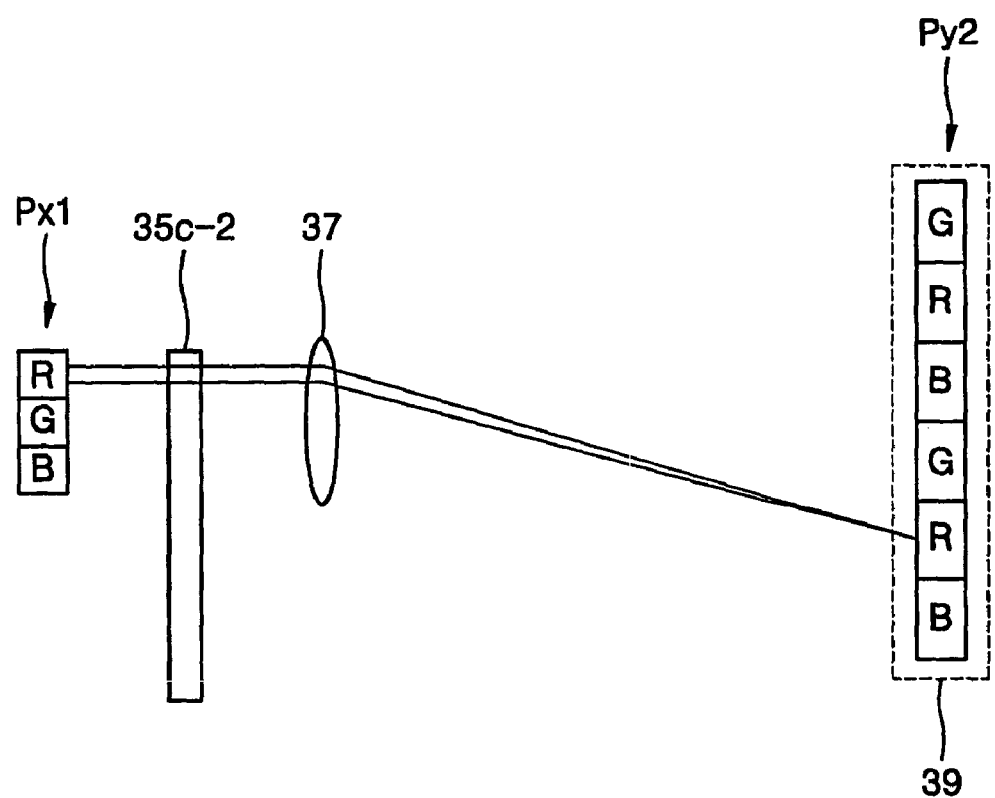
Figure 11C:
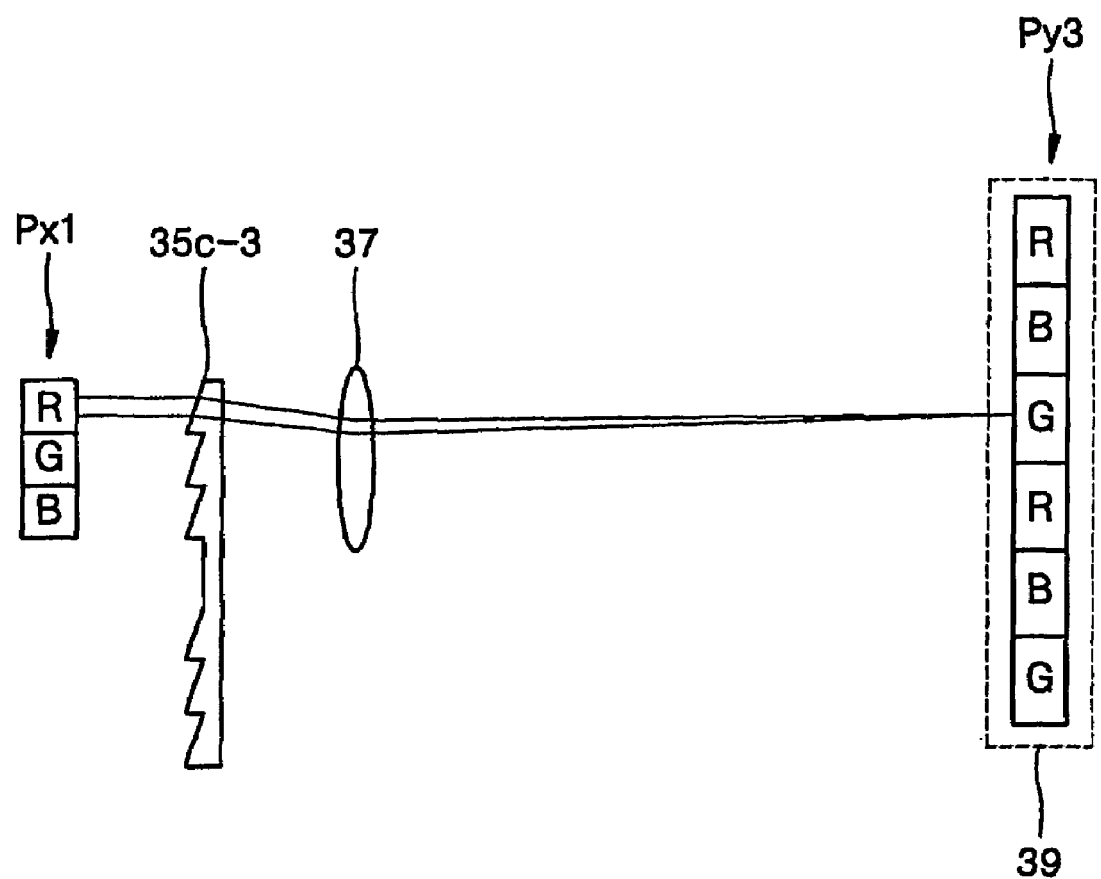

FIGS. 11A through 11C are schematic diagrams of a high-resolution display including the third ring-shaped prism array 35*c* shown in FIG. 10, according to a fourth aspect of the present invention. FIGS. 11A through 11C show the sequential movement of the pixel having R, G, and B subpixels sequentially arranged on the screen 39.

Referring to FIG. 11A, when a first pixel Px1 having the R, G, and B subpixels sequentially arranged faces the first area 35*c*-1 of the third ring-shaped prism array 35*c*, the light forming the first pixel Px1 is deflected to the left by the third ring-shaped prism array 35*c*, and then reflected by the protection lens 37, thus, forming a pixel Py1 having the color arrangement of R, G, B, R, G, and B from the right side of the screen 39.

Referring to FIG. 11B, when the pixel Px1 faces the second region 35*c*-2 due to a 120 degree rotation of the third ring-shaped prism array 35*c*, light forming the pixel Px1 forms a pixel Py2 having the color arrangement of B, R, G, B, R, and G from the right side of the screen 39. The color arrangement of the pixel Py2 can be obtained by shifting the color arrangement of the pixel Px2 to the right by one subpixel. The pixel Py2 is an original pixel, which is formed on the screen 30 without deflection after passing through the second area 35*c*-2 and then being reflected by the projection lens 37.

Referring to FIG. 11C, when the pixel Px1 faces the third region 35*c*-3 due to a counterclockwise rotation of the third ring-shaped prism array 35*c*, light forming the pixel Px1 is deflected to the right and forms a pixel Py3 having the color arrangement of G, B, R, G, B, and R from the right side of the screen 39.

The second ring-shaped prism array 35*b* shown in FIG. 7 can be modified to include a plane lens occupying at least ⅓ of an entire area thereof in a similar form to the third ring-shaped prism array 35*c*, so that the pixel is moved to three positions on the screen 39, thereby increasing the original resolution by three times.

Figure 12:
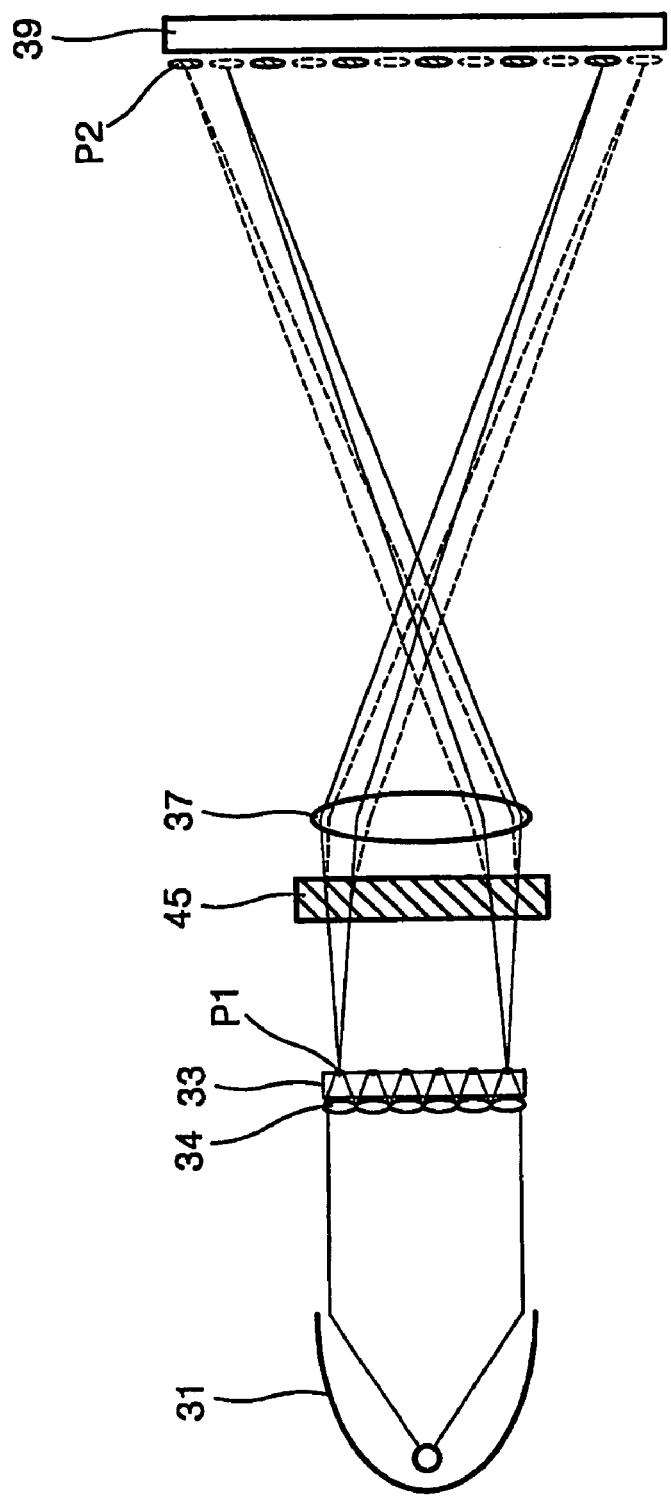
FIG. 12 is a schematic diagram of the high-resolution display according to another aspect of the present invention.

FIG. 12 is a schematic diagram of the high-resolution display, according to another aspect of the present invention. The high-resolution display, according to an aspect of the present invention, uses a mirror array 45, such as a drive mirror array, for example, a deformable mirror device (DMD), or a galvanic mirror, as a beam steering device in order to change an optical path.

The light emitted from the light source 31 forms an image having pixels according to the image signal applied to the light value 33. The pixels are reduced by the micro lens array 34, thereby forming inter-pixel spacing. The light output from the light valve 33 is reflected by the mirror array 45 in the first direction and the second direction, opposite to the first direction, so the pixels are moved. The projection lens 37 magnifies and projects the moved pixels onto the screen 39. Consequently, the image of having the high resolution is displayed. Here, the first and second directions may be up and down directions or left and right directions.

In the high-resolution display according to another aspect of the present invention, the light source 31, the micro lens array 34, the light valve 33, and the projection lens 37 have the same structures and functions as those described in the above aspects.

According to an aspect of the present invention, original pixels are reduced using a micro lens array to form spacing among the pixels, and then, a light output from a light valve is deflected in a predetermined direction using a beam steering device. Consequently, a number of pixels greater than the number of original pixels are displayed on a screen. Therefore, according to an aspect of the present invention, there is provided a display capable of increasing a corresponding resolution.

As described above, according to an aspect of the present invention, one of the many advantages of the present invention includes increasing a number of pixels by changing an optical path and realizing a high quality image having a high resolution.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A high-resolution display displaying an image on a screen, comprising:
   an illumination optical system comprising a light source emitting a light;
   an image optical system comprising an image forming device modulating the light incident to form the image;
   a pixel moving optical system comprising a prism array deflecting the light from the image optical system to move pixels of the image to increase a number of pixels; and
   a projection optical system comprising a projection lens projecting the deflected light by the pixel moving optical system onto the screen,
   wherein the prism array is a ring-shaped prism array.

2. The high-resolution display of claim 1, wherein the image optical system further comprises a micro lens array reducing the pixels of the image formed by the image forming device.

3. The high-resolution display of claim 1, wherein the ring-shaped prism array comprises a plurality of ring-shaped prisms concentrically arranged and having slants inclined in one direction so that the modulated light is deflected in a first direction and, after a rotation of the ring-shaped prism array by 180 degrees, the modulated light is deflected in a second direction opposite to the first direction.

4. The high-resolution display of claim 2, wherein the ring-shaped prism array comprises a plurality of ring-shaped prisms concentrically arranged and having slants inclined in one direction so that the modulated light is deflected in a first direction and, after a rotation of the ring-shaped prism array by 180 degrees, the modulated light is deflected in a second direction opposite to the first direction.

5. The high-resolution display of claim 1, wherein the ring-shaped prism array comprises a plurality of fan-shaped prisms arranged around a center thereof to form a ring shape and having slants of symmetrical patterns with respect to a predetermined axis so that the modulated light is deflected in a first direction and, after a rotation of the ring-shaped prism array by 180 degrees, the modulated light is deflected in a second direction opposite to the first direction.

6. The high-resolution display of claim 2, wherein the ring-shaped prism array comprises a plurality of fan-shaped prisms arranged around a center thereof to form a ring shape and having slants of symmetrical patterns with respect to a predetermined axis so that the modulated light is deflected in a first direction and, after a rotation of the ring-shaped prism array by 180 degrees, the modulated light is deflected in a second direction opposite to the first direction.

7. The high-resolution display of claim 1, wherein the ring-shaped prism array comprises:
   a first ring-shaped prism array comprising a plurality of ring-shaped prisms concentrically arranged and having slants inclined in one direction so that the modulated light is deflected in a first direction and, after a rotation of the first ring-shaped prism array by 180 degrees, the modulated light is deflected in a second direction opposite to the first direction; and
   a second ring-shaped prism array comprising a plurality of sector-shaped prisms arranged around a center thereof to form a ring shape and having slants of symmetrical patterns with respect to a predetermined axis so that the modulated light is deflected in a second direction perpendicular to the first direction and, after a rotation of the second ring-shaped prism array by 180 degrees, the modulated light is deflected in a direction opposite to the second direction.

8. The high-resolution display of claim 2, wherein the ring-shaped prism array comprises:
   a first ring-shaped prism array comprising a plurality of ring-shaped prisms concentrically arranged and having slants inclined in one direction so that the modulated light is deflected in a first direction and, after a rotation of the first ring-shaped prism array by 180 degrees, the modulated light is deflected in a second direction opposite to the first direction; and
   a second ring-shaped prism array comprising a plurality of sector-shaped prisms arranged around a center thereof to form a ring shape and having slants of symmetrical patterns with respect to a predetermined axis so that the modulated light is deflected in a second direction perpendicular to the first direction and, after a rotation of the second ring-shaped prism array by 180 degrees, the modulated light is deflected in a direction opposite to the second direction.

9. The high-resolution display of claim 1, wherein the ring-shaped prism array comprises a plane lens having a fan shape in at least ⅓ of an entire area thereof to transmit the modulated light, and in a remaining area thereof a plurality of prisms are concentrically arranged, which comprise slants inclining in one direction so that the modulated light is deflected in a first direction and, after a rotation of the ring-shaped prism array by 120 degrees, the modulated light is deflected in a second direction opposite to the first direction.

10. The high-resolution display of claim 2, wherein the ring-shaped prism array comprises a plane lens having a fan shape in at least ⅓ of an entire area thereof to transmit the modulated light, and in a remaining area thereof a plurality of prisms are concentrically arranged, which comprise slants inclining in one direction so that the modulated light is deflected in a first direction and, after a rotation of the ring-shaped prism array by 120 degrees, the modulated light is deflected in a second direction opposite to the first direction.

11. The high-resolution display of claim 1, wherein the ring-shaped prism array comprises a plane lens having a sector shape in at least ⅓ of an entire area thereof to transmit the modulated light, and in a remaining area thereof a plurality of sector-shaped prisms are arranged around a center thereof to form a ring shape, comprising slants with a symmetrical pattern with respect to a predetermined axis so that the modulated light is deflected in a first direction and after a rotation of the ring-shaped prism array by 120 degrees, the modulated light is deflected ma second direction opposite to the first direction.

12. The high-resolution display of claim 2, wherein the ring-shaped prism array comprises a plane lens having a sector shape in at least ⅓ of an entire area thereof to transmit the modulated light, and in a remaining area thereof a plurality of sector-shaped prisms are arranged around a center thereof to form a ring shape, comprising slants with a symmetrical pattern with respect to a predetermined axis so that the modulated light is deflected in a first direction and, after a rotation of the ring-shaped prism array by 120 degrees, the modulated light is deflected in a second direction opposite to the first direction.

13. The high-resolution display of claim 1, further comprising:
a relay lens shaping the light in front of the light source to uniformly emit the light toward the image optical system.

14. The high-resolution display of claim 1, wherein the light source comprises one of a metal halide lamp, a xenon lamp, and a halogen lamp.

15. The high-resolution display of claim 1, wherein the pixel moving optical system comprises a beam steering device to quickly move the modulated light from the image optical system in horizontal and vertical directions displaying the number of pixels in a spacing among the pixels of the screen with a slight time delay, increasing the number of pixels.

16. The high-resolution display of claim 15, wherein the beam steering device is rotated during the image display to achieve a high resolution.

17. The high-resolution display of claim 15, wherein the beam steering device comprises a mirror array comprising a deformable mirror device (DMD) or a galvanic mirror to change an optical path.

18. The high-resolution display of claim 8, wherein the ring-shaped prism array further comprises:

a third ring-shaped prism array in which the pixel is divided into the plurality of color light beams, and comprising first through third regions, wherein in the first and third regions, the plurality of ring-shaped prisms having the slants inclining in one direction are concentrically arranged around the center and the second region occupies ⅓ of the entire area of the third ring-shaped prism array, forming a fan shape, and is realized as a plane lens.

19. The high-resolution display of claim 8, wherein the light incident on the second region passes through without being deflected and, forms an original pixel at an original position on the screen, the light incident on the first region is deflected in the first direction, and the light incident on the third region is deflected in the second direction opposite to the first direction.

20. The high-resolution display of claim 1, wherein the image forming device is a light valve comprising a liquid crystal display (LCD).

21. The high-resolution display of claim 20, wherein the light valve comprises a projection or reflection liquid crystal display (LCD), a ferroelectric device, or a deformable mirror.

* * * * *

UNITED STATES PATENT AND TRADEMARK OFFICE
CERTIFICATE OF CORRECTION

| | |
|---|---|
| PATENT NO. | : 6,971,748 B2 |
| APPLICATION NO. | : 10/629721 |
| DATED | : December 6, 2005 |
| INVENTOR(S) | : Kun-ho Cho et al. |

Page 1 of 1

It is certified that error appears in the above-identified patent and that said Letters Patent is hereby corrected as shown below:

Title page,
Item [75], Inventors, replace "Tae hee" with -- Tae-hee --;
Item [56], References Cited, FOREIGN PATENT DOCUMENTS, replace "2/2000" with -- 2/2002 --;

Column 10,
Line 56, replace "ma" with -- in a --.

Signed and Sealed this

Twentieth Day of June, 2006

JON W. DUDAS
*Director of the United States Patent and Trademark Office*